(12) United States Patent
First et al.

(10) Patent No.: US 11,782,174 B2
(45) Date of Patent: Oct. 10, 2023

(54) ELECTRICAL RESISTANCE DEVICE FOR RADIATION DETECTION

(71) Applicant: Georgia Tech Research Corporation, Atlanta, GA (US)

(72) Inventors: Phillip Neal First, Atlanta, GA (US); Zhigang Jiang, Atlanta, GA (US); Thomas Michael Orlando, Atlanta, GA (US); Elliot Christian Frey, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 38 days.

(21) Appl. No.: 17/625,206

(22) PCT Filed: Jul. 10, 2020

(86) PCT No.: PCT/US2020/041655
§ 371 (c)(1),
(2) Date: Jan. 6, 2022

(87) PCT Pub. No.: WO2021/011395
PCT Pub. Date: Jan. 21, 2021

(65) Prior Publication Data
US 2022/0365233 A1    Nov. 17, 2022

Related U.S. Application Data

(60) Provisional application No. 62/874,632, filed on Jul. 16, 2019.

(51) Int. Cl.
*G01T 1/26* (2006.01)
*G01T 3/00* (2006.01)

(52) U.S. Cl.
CPC . *G01T 1/26* (2013.01); *G01T 3/00* (2013.01)

(58) Field of Classification Search
CPC .................................. G01T 1/26; G01T 3/00
See application file for complete search history.

(56) References Cited

U.S. PATENT DOCUMENTS

| | | | |
|---|---|---|---|
| 7,372,009 B1 * | 5/2008 | Losee | G01T 3/08 250/200 |
| 7,964,848 B2 | 6/2011 | Hamby et al. | |

(Continued)

OTHER PUBLICATIONS

Sun et al.: "Room temperature detection of individual molecular physisorption using suspended bilayer graphene"; Apr. 15, 2016; Science Advances; American Association for the Advancement of Science.

*Primary Examiner* — Marcus H Taningco
(74) *Attorney, Agent, or Firm* — Bryan W. Bockhop; Bockhop Intellectual Property Law, LLC (57) ABSTRACT

A radiation detector (100) includes an insulating substrate (110), which includes a material that undergoes a change in an electrical property when subjected to ionizing radiation. A conductive film (112) is disposed in relation to a surface of the substrate. The conductive film (112) has a resistance that is a function of a state of the electrical property. A resistance measuring device measures resistance across the conductive film (112). The resistance measured by the resistance measuring device indicates an amount of ionizing radiation to which the substrate (110) has been subjected. In a method of determining exposure to a type of radiation, a boron nitride substrate is exposed to a radiation environment. A resistance is measured across a conductive film disposed in relation to the boron nitride substrate. Radiation exposure is calculated as a function of the resistance.

23 Claims, 3 Drawing Sheets

(56) References Cited

U.S. PATENT DOCUMENTS

| | | |
|---|---|---|
| 7,982,191 B2 | 7/2011 | Friedman et al. |
| 8,232,530 B2 | 7/2012 | Pausch et al. |
| 8,981,346 B1 | 3/2015 | Kamin et al. |
| 9,213,112 B2 | 12/2015 | Stubbers et al. |
| 9,508,885 B1 | 11/2016 | Li et al. |
| 10,024,987 B2 | 7/2018 | Boese et al. |
| 11,287,536 B1* | 3/2022 | Howell ............. H01L 27/14659 |
| 2005/0127300 A1 | 6/2005 | Bordynuik |
| 2013/0082241 A1 | 4/2013 | Kub et al. |
| 2015/0276950 A1 | 10/2015 | Bensaoula et al. |
| 2015/0372159 A1* | 12/2015 | Englund ................. G01J 3/12 250/206 |
| 2016/0041155 A1* | 2/2016 | Takulapalli ........ G01N 33/5438 506/18 |
| 2016/0227639 A1* | 8/2016 | Kaminer ................. H05H 3/00 |
| 2017/0269239 A1* | 9/2017 | Kamieniecki ............. G01T 1/24 |
| 2019/0107502 A1* | 4/2019 | Carr ...................... G01N 27/18 |
| 2019/0162866 A1* | 5/2019 | Radivojevic ............ G01T 1/247 |
| 2019/0189902 A1* | 6/2019 | Benedict ................ H10N 30/50 |

* cited by examiner

ELECTRICAL RESISTANCE DEVICE FOR RADIATION DETECTION

CROSS-REFERENCE TO RELATED APPLICATION(S)

This application claims the benefit of U.S. Provisional Patent Application Ser. No. 62/874,632, filed Jul. 16, 2019, the entirety of which is hereby incorporated herein by reference.

STATEMENT OF GOVERNMENT SUPPORT

This invention was made with government support under 80ARC017M0007, awarded by NASA. The government has certain rights in the invention.

BACKGROUND OF THE INVENTION

1. Field of the Invention

The present invention relates to ionizing radiation detectors and, more specifically, to an ionizing radiation detector not requiring constant power.

2. Description of the Related Art

Radiation detectors are employed in a variety of applications. One type of application includes detecting an amount of exposure to radiation over time. For example, a worker who works in environments that can potentially result in exposure to radiation usually wears a radiation badge, also referred to as a film badge dosimeter or film badge. A radiation badge stores information regarding the amount of ionizing radiation to which the worker has been exposed over a given amount of time. Periodically, the radiation badge is checked to see if the worker is approaching a maximum exposure.

Typical film badges employ a film that is similar to photographic film, except that it reacts to ionizing radiation instead of visible light. Such badges are developed using a chemical process and the density of the developed film indicates the amount of exposure. Disadvantageously, the developing process can take time, it can be somewhat subjective and the badge cannot be reused after having been developed.

Electronic devices have also been used to determine amounts of radiation exposure, but they typically require application of constant electric power to operate. Thus, such devices are limited to applications in which electric power is constantly available.

Therefore, there is a need for an ionizing radiation detection system that can detect radiation without constant power and that be used repeatedly even after having been read.

SUMMARY OF THE INVENTION

The disadvantages of the prior art are overcome by the present invention which, in one aspect, is a radiation detector that includes a first insulating substrate, which includes a material that undergoes a change in an electrical property when subjected to ionizing radiation. A first conductive film is disposed in relation to a surface of the first insulating substrate. The first conductive film has a resistance that is at least partially a function of a state of the electrical property of the first insulating substrate. A first resistance measuring device is configured to measure a resistance across the first conductive film. The resistance measured by the first resistance measuring device indicates an amount of ionizing radiation to which the first insulating substrate has been subjected.

In another aspect, the invention is a radiation detection system that includes a boron nitride substrate. A conductive film is disposed on a surface of the boron nitride substrate. The conductive film has a resistance that is at least partially a function of a state of the predetermined property of the boron nitride substrate. A first electrical contact is in electrical communication with the conductive film and a spaced-apart second electrical contact is in electrical communication with the conductive film. A current source is configured to apply a current from the first electrical contact to the second electrical contact. A third electrical contact is in electrical communication with the conductive film and a spaced-apart fourth electrical contact is in electrical communication with the conductive film. The third electrical contact and the fourth electrical contact are disposed between the first electrical contact and the second electrical contact. A resistance sensor is configured to measure a resistance between the third electrical contact and the fourth electrical contact. The resistance measured by the resistance sensor indicates an amount of ionizing radiation to which the boron nitride substrate has been subjected.

In yet another aspect, the invention is a method of determining exposure to a type of radiation, in which a boron nitride substrate is exposed to a radiation environment. A resistance is measured across a conductive film disposed in relation to a surface of the boron nitride substrate such that resistance across the conductive film changes as a result of exposure of the boron nitride substrate to the type of radiation. An amount of radiation exposure is calculated as a function of the resistance.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 1A:
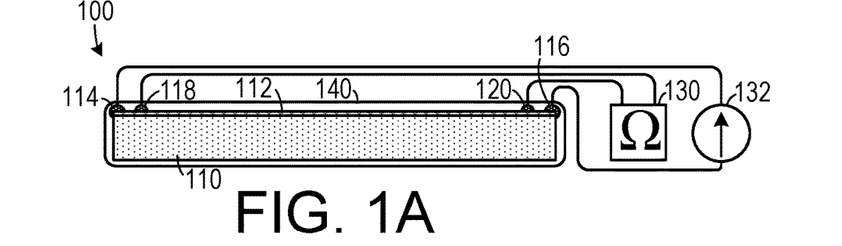
FIG. 1A is an elevational schematic view of one embodiment of a radiation detection system.
Figure 1B:
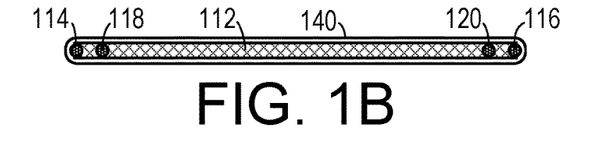
FIG. 1B is a top plan view of the embodiment shown in FIG. 1A.

As shown in FIGS. 1A-1B, one embodiment of a radiation detection system 100 includes a first insulating substrate 110 that is substantially made from material that undergoes a change in an electrical property when subjected to ionizing radiation, such as hexagonal boron nitride. In other embodiments, substrate 110 can include materials such as a boron allotrope, an insulating hafnium compound, hafnium dioxide, hafnium silicate, an insulating gadolinium compound, a gadolinium oxide, gadolinium silicate and also combinations or compounds of these materials. While these materials are suitable for neutron detection, other materials could be used for detecting other types of radiation. For example, gamma and x-ray radiation could be detected using insulating substrates containing large amounts of high-Z materials such as those in row 6 of the periodic table. Examples of these include: Hf, Ta, W, Pb, and Bi compounds with sulfur and oxygen. Certain compounds could create high electric fields (e.g., $HfO_2$) and can occur as layered (van der Waals) substrates and certain compounds act as insulating materials (e.g.: $TaS_2$, $WS_2$, $PbS_2$, $Bi_2S_3$). PbS is not layered, but very inert and may also be employed in certain applications.

The insulating substrate 110 can be rigid or it can be flexible, depending on the application. The insulating substrate 110 may include insulating flakes or nanoparticles (for example, flakes or nanoparticles of hexagonal boron nitride) or it may include a matrix of flakes (or nanoparticles) within a binder (for example, an epoxy binder or a flexible polymer binder).

A first conductive film 112 is disposed adjacent to a surface of the first insulating substrate 110. The first conductive film 112 having a resistance that is at least partially a function of a state of the electrical property of the first insulating substrate. In one embodiment, the first conductive film 112 includes graphene, such as a graphene ribbon, a graphene sheet or a contiguous plurality of graphene flakes that are in electrical communication with each other. Preferably, the first conductive film 112 is a single-atom-thick or a few-atom-thick conducting layer with low charge density. In certain embodiments, the first conductive film 112 can include such materials as: a conductive boron allotrope, hafnium, bismuth, and gadolinium. It could include, in certain embodiments, conductive metal-chalcogenides such as $WTe_2$, $Bi_2Se_3$, and $GdTe_3$. Also, the first conductive film can include combinations of these materials. The first conductive film 112 may also be a surface state at the surface of a material which is substantially electrically-insulating in its bulk. It may also be an electrically-conductive interface state at the interface between two materials which are substantially electrically-insulating within their bulks. It may also be an electrically-conductive state at the interface between two bulk regions of the same insulating material (e.g., at a grain boundary or stacking fault).

A first electrical contact 114 and a second electrical contact 116 are in electrical communication with the first conductive film 112. Similarly, a third electrical contact 118 and a fourth electrical contact 120 are also in electrical communication with the first conductive film 112. A current source 132 supplies a current from the first electrical contact 114 to the second electrical contact 116 and a first resistance sensor 130 measures the resistance between the third electrical 118 contact and the fourth electrical contact 120, which indicates an amount of ionizing radiation to which the first insulating substrate 110 has been subjected. The contacts could include, for example, gold, silver or another conductive metal, including layers of chromium, titanium, or related alloys (e.g., chromium-gold or titanium-gold) used for enhancing adhesion of the contact to the film.

An encapsulating material 140 can envelop at least the first insulating substrate 110 and the first conductive film 112. The encapsulating material 140 can include a flexible polymer. In certain embodiments, the encapsulating material 140 can be transparent to the radiation of interest, whereas in other embodiments it can inhibit the radiation of interest. For example, in a high neutron environment, the encapsulating material 140 be chosen to help slow the neutrons, which allows them to interact more easily with a neutron-sensitive insulating layer 110. The encapsulating material 140 may be rigid (as, for instance, an epoxy) or it may be flexible (as, for instance, a polymer, such as polyethylene, or a polymer matrix that may include—for instance—boron nitride flakes or other particles) depending on the specific application.

The voltages and currents associated with measuring the resistance depend on physical dimensions and specific materials. For most applications, voltages would be below 20 volts and currents below 0.1 ampere. It is not required to make continuous measurement of the resistance of the conductive film 112. Electrical power may be removed from the device for some amount of time. The device resistance may depend on the total radiation exposure, regardless of when or whether electrical power is applied to the device.

Local and extended defects in the substrate 110, induced by the incident radiation, affect the electrical resistance of film 112. In certain embodiments, the thickness of the substrate 110 may range from a few atomic layers to millimeters. The thickness of the substrate 110 may be chosen to maximize the effect of defects in the substrate 110 on the resistivity of the conductive film 112. The thickness of the substrate 110 also may be chosen to achieve desired mechanical properties such as stiffness or flexibility. The width and length of the device, and positions and numbers of electrical contacts, can be tuned to the radiation sensing requirements. For example, typical dimensions of one embodiment would be 10 nanometers to 1 centimeter for the width and 100 nanometers to 1 meter for the length.

Figures 2, 3:
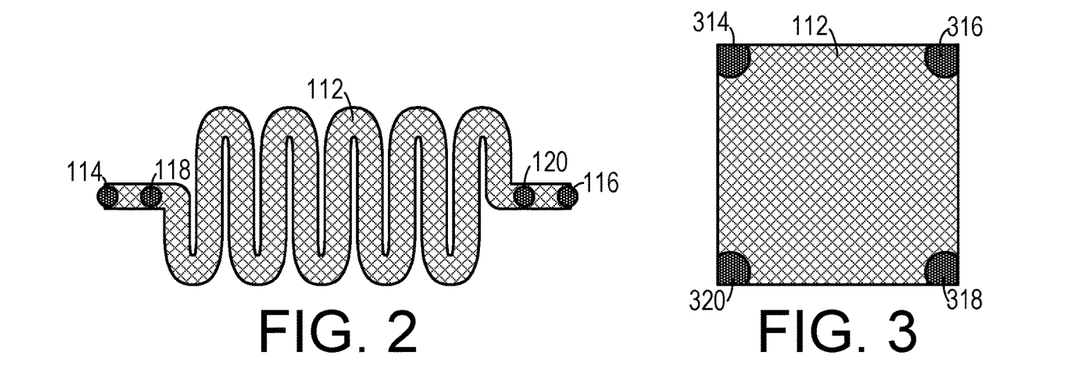
FIG. 2 is a top plan view of an embodiment employing an undulated shape.
FIG. 3 is a top plan view of an embodiment employing a polygonal shape.

The radiation detection device can have one of many shapes, including a ribbon shape, as shown in FIGS. 1A and 1B. It can also have: an undulated shape, as shown in FIG. 2; a polygonal shape such as a square shape, as shown in FIG. 3; a round shape, etc. These alternate shapes can increase the probability of the device interacting with radiation in applications requiring a limited maximum length. If a rectilinear shape, such as the square shape of FIG. 3, is employed, the contacts 314, 316, 318 and 320, can be placed at the corners and the van der Pauw method (or similar methods which may involve fewer or more electrical contacts) may be employed to determine the resistance. The overall resistance can be raised by increasing the length to width ratio of the area. For a chosen area, the resistance can be reduced by increasing the number of conductive layers.

In one neutron-detecting embodiment employing a boron nitride substrate 110, the boron nitride can be enriched in $^{10}B$ relative to the amount of $^{11}B$ present, which can be desirable because $^{10}$B has a much larger neutron cross section than $^{11}$B and, thus, $^{10}$B is a better neutron absorber.

Figure 4:
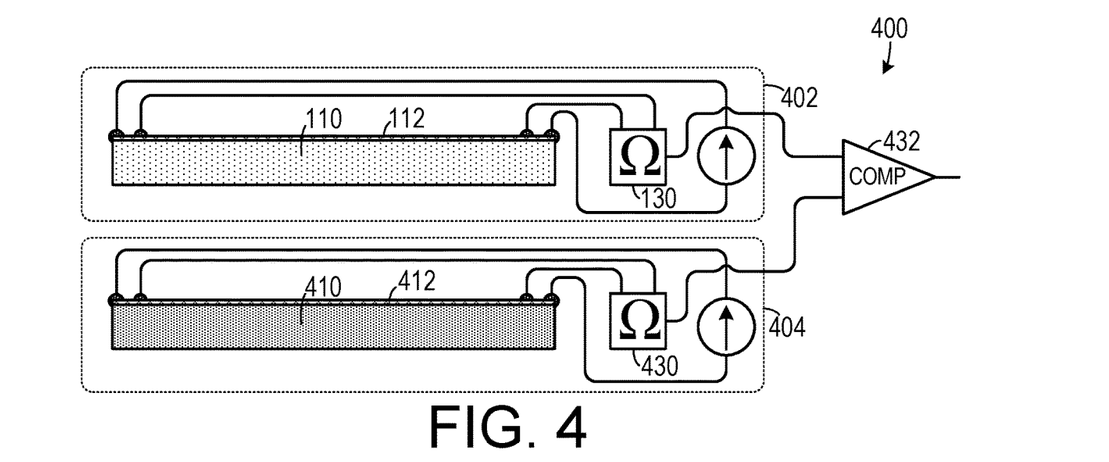
FIG. 4 is an elevational schematic view of a differential radiation detection system.

Shown in FIG. 4 is one embodiment of a differential radiation detector 400 that can be used to determine a relative amount of radiation attributable to neutrons versus other types of radiation. This embodiment includes a first detector unit 402 of the type described above and a second detector unit 404 that includes a second insulating substrate 410 in which the boron nitride is enriched in $^{10}$B relative to $^{11}$B. A second resistance sensor 430 measures resistance across a second conductive film 412 and a comparison circuit 432 compares resistance measured by the first resistance sensor 130 to resistance measured by the second resistance sensor 430, which can indicate the amount of radiation exposure that is attributable to neutrons.

The differential measurement could also be done with appropriate isotopes of other materials, particularly $^{157}$Gd, where a film enriched in $^{157}$Gd would have high neutron sensitivity and one depleted in $^{157}$Gd would have low neutron sensitivity.

Figure 5A:
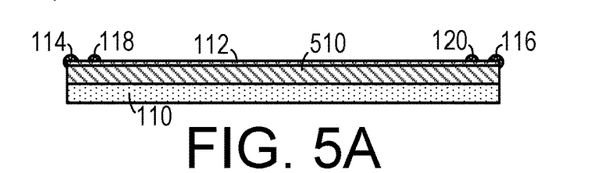
FIG. 5A-5D are several elevational schematic views of radiation detectors employing amplifying layers.
Figure 5B:
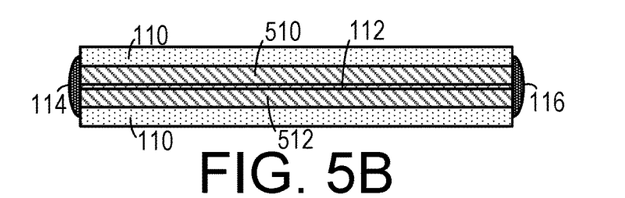
Figure 5C:
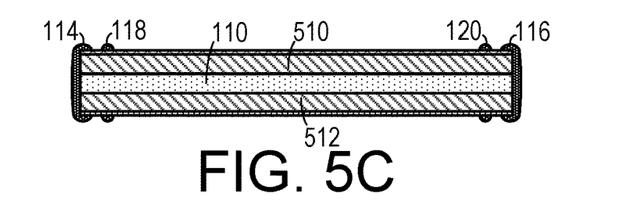
Figure 5D:
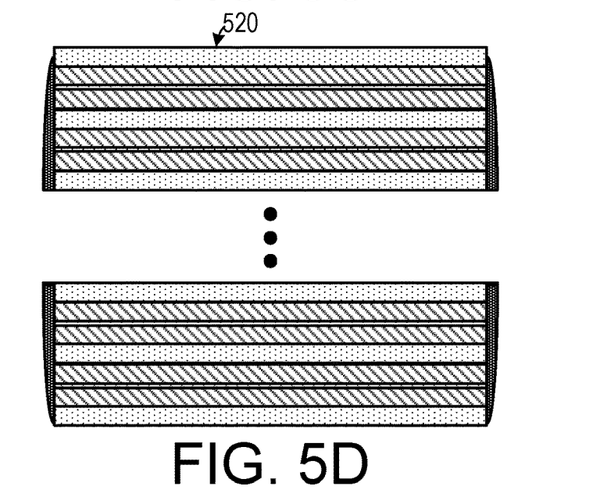

In certain embodiments, as shown in FIGS. 5A-5D, an amplifying layer 510 that includes a material that has an electrical property that changes when the change in the electrical property of the first insulating substrate occurs (such as a non-conductive ferroelectric material) can be added. In certain embodiments, the amplifying layer 510 can be disposed between the insulating substrate 110 and the conductive film 112. The amplifying layer 510 increases a change in the resistance across the first conductive film 112 when the first insulating substrate 110 has been subjected to radiation. Certain embodiments can include a second amplifying layer 512, as shown in FIGS. 5B and 5C. The embodiment shown in FIG. 5D can include stacks of these layers running in parallel, which can reduce the overall resistance. Such multilayer embodiments illustrate that resistance can be reduced, and interaction volume increased, for a given sensing area. With independent measurements of layer resistances, multilayer embodiments may also be used in radiation spectroscopy, as particles with greater energies will pass through more layers than those of lesser energies.

These layers may be chosen to optimize different aspects of radiation sensing. For example, one may choose one layer as a neutron-sensing layer, such as hBN, hBN isotopically-enriched in $^{10}$B, or $Gd_2O_3$. Another layer may be chosen to be a material which has radiation-induced defects that substantially influence the resistance of the conductive film 112. Since neutron-capture by an element invariably produces high-energy secondary radiation, neutron capture in a layer may cause radiation-induced defects in other layers, thus the combination of such layers, in comparison to either alone, may result in higher sensitivity to neutron radiation.

For low resistance devices ("low" depends on the circuit capacitance, but practically speaking, <100 ohms), real-time monitoring of dynamic changes (microsecond to nanosecond time scales) can detect single-particle events. The quantum efficiency can depend on the radiation and materials chosen, similarly to other solid-state detectors currently in use (e.g., Si MOSFETs, the Graphene FET, etc.). The resistance can be changed by changing the device area and by layering devices.

For passive dosimetry, where the retained effect on the resistance is measured after exposure, it is currently estimated that for a 1000 ohm sensor of area under 50 mm$^2$, the minimum detectable dose would be better than 1 mGy (0.1 rad). This would be equivalent to a "shallow dose" for which occupational limits are 500 mSv equivalent dose per year (for photons, that is a 500 mGy dose). A 1-Hz measurement bandwidth has been chosen for this estimate. A longer measurement would decrease the estimate. For example, measuring for 100 seconds (10 mHz bandwidth) could improve the result to a 0.1 mGy detectable dose.

In the presence of a steady flux of radiation, the detector will be more sensitive than for passive dosimetry because there is less time for internal relaxation of the charge and electric field configurations. In this case, the minimum detectable dose (1-Hz bandwidth) would likely be less than 1 mGy (or an absorption rate of 1 mGy/s). For a smaller bandwidth, the minimum detectable flux would be smaller, scaling with the square-root of the bandwidth (0.1 mGy/s for 10 mHz bandwidth).

Figure 6:
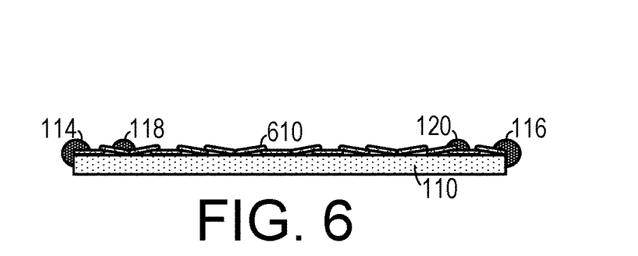
FIG. 6 is an elevational schematic view of an embodiment employing conductive flakes.

As shown in FIG. 6, one embodiment of the conductive film can employ a plurality of graphene (or conductive material) flakes 610 that are all in electrical communication with each other. This embodiment could be easier to manufacture than continuous graphene sheet or ribbon embodiments, especially for larger surface area detectors.

Figure 7:
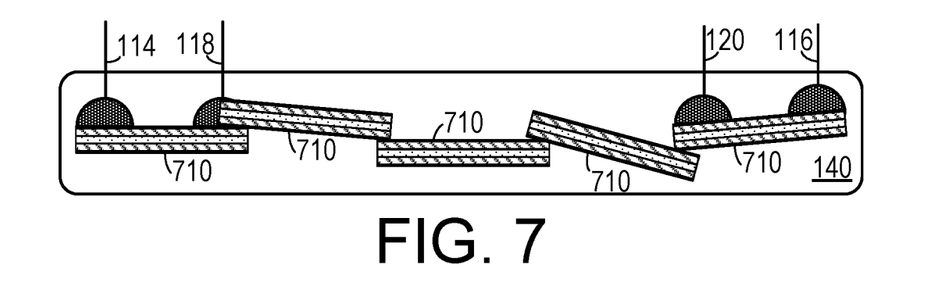
FIG. 7 is an elevational schematic view of an embodiment employing flaked sensitive units.
Figure 8:
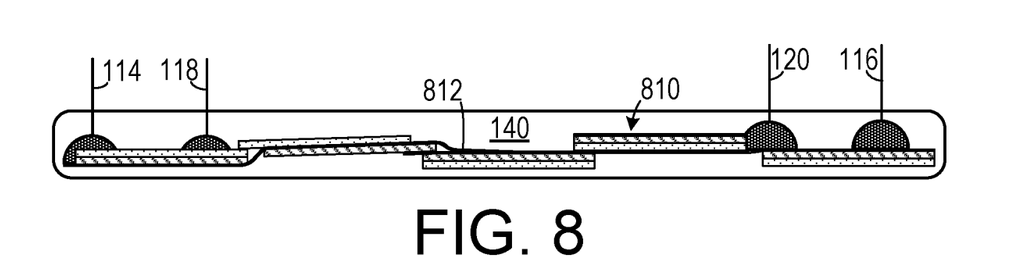
FIG. 8 is an elevational schematic view of a second embodiment employing flaked sensitive units.

As shown in FIG. 7, flakes of detector units 710 can be arranged so that their graphene layers are all in electrical communication with each other. Alternately, as shown in FIG. 8, flakes of the components 810 can be deposited in such a way as to have conductive film 812 that is electrically contiguous across the device. These embodiments might be easier to manufacture on a large scale for certain applications.

The present invention can be employed in the detection of ionizing radiation and the detection of neutron radiation using different configurations of materials including one-atom-thick to few-atom-thick materials (e.g., graphene or graphene nanoribbons), quasi-two-dimensional materials or thin films (e.g., hexagonal boron nitride), and topological materials (e.g., bismuth selenide and tungsten diselenide). The amounts of radiation detected can be a function the electrical resistance detected in these structures. Certain embodiments, some of which employ polymeric encapsulation, can result in mechanically flexible detectors. Certain embodiments can be employed in micropower operation, integrating dosimetry with on-demand readout, large area detectors, and single-particle detectors.

Heterogeneity is achieved through stacking of material layers such that an electrically-conducting layer (e.g., mono-layer, bi-layer, or few-layer graphene) is disposed on an electrically-insulating layer (e.g., mono-layer bi-layer, few-layer, or many-layer hexagonal boron nitride). This basic configuration may be singular, or it may be repeated many times in the direction perpendicular to the plane of the material layers (with possible variations in layer thicknesses). At two or more positions on the area of the material layers, electrical contacts (e.g., thin metal films or film-couples, such as gold, chromium/gold, or other couples, multilayers, alloys, or elements) are affixed to the conductive layers.

The invention measures the electrical resistance parallel (in essence) to the plane of the conductive layer(s). The resistance is affected by the passage of ionizing radiation or by the passage of neutrons (which may undergo a neutron capture reaction during passage). The source of electrical resistance change may be the creation of defects and charge traps within the material layer(s) (or changes in domain configuration for ferroelectric or ferromagnetic layers). Since these defects or configurations may be retained for some time, they may affect the flow of electrical current parallel to the conductive layer(s) for some time. The effect of radiation on the electrical resistance occurs even in the absence of voltages and currents used for measuring the resistance. Readout of the resistance may be done on demand at any time and the resistance will depend on the accumulated defects within the materials. Thus, the resistance measures the integrated dose of radiation received by the device.

The material layers may be disposed on top of or between electrodes which can provide an electric field substantially perpendicular to the material layers and act as "gate electrodes." Such gate electrodes may be used to change the charge density within the conductive layers, which changes the overall resistance and potentially enhances sensitivity to radiation. For some embodiments, the gate electrodes may be unnecessary. In certain embodiments, the gate electrodes may be conductive layers fabricated as part of the layer stack, but electrically-isolated from the layers used for resistance measurement.

Several types of insulating layers may be included in the layer stacks, e.g., a neutron-sensitive layer such as hexagonal boron nitride (hBN), and layer(s) which enhance resistance changes in the conductive layer(s), such as a piezoelectric layer.

Several of the insulating material layer(s) may be polar, piezoelectric, ferroelectric, or ferroelectric, in order to enhance the change in electrical resistance of the conductive layer(s). By affecting local electric fields, the ferroelectric layer may enhance the effect of defects (in any of the layers) on the electrical resistance of the conductive layer(s). Radiation-induced changes in the ferroelectric domain configurations also can directly affect the local electric fields and consequently the conductive-layer resistance.

Several of the material layer(s) may be ferromagnetic, ferrimagnetic, or antiferromagnetic. Radiation-induced changes in the magnetic domain configuration can change the electrical resistance of the device through magnetoresistive effects.

The conductive layer(s) may be surface or interface states at the boundary of substantially electrically-insulating material(s). The surface or interface states may be due to the topological properties of the electronic band structure of the material(s).

The conductive layer may be formed from quasi-1D "nanoribbons" of 2D material (e.g., graphene). In this configuration, electrical resistance is less sensitive to proximal defects and charge traps, which is useful for high-radiation environments or to provide a radiation-insensitive electrical resistance, against which other radiation-sensitive embodiments can be compared. The conductive quasi-1D nanoribbon may be conductive electron (or hole) state(s) that are confined substantially to an edge of an otherwise substantially electrically-insulating quasi-2D material, or to the quasi-1D interface between substantially insulating quasi-2D materials. The edge state(s) may be due to the topological properties of the quasi-2D insulating material(s).

Microscopic flakes of the basic layered configuration may be spread over an area such that they contact one another frequently enough to allow electrical current to flow from one portion of the area to another. Radiation will affect each flake in the same manner as described above, thus the resistance of the ensemble of flakes will change in a similar way. Encapsulated by non-conductive polymers or similar materials, such an ensemble of flakes may be useful for creating a flexible large-area radiation monitor, or a flexible dosimeter patch. Layering within and among the flakes need not be identical.

Repetition of a layering order may be accomplished through rolling an arrangement of layers onto itself (analogous to rolling a rug) or folding an arrangement of layers onto itself (mirroring the stacking order or not, depending on the pattern of folds). In the case of a back-fold, the stacking order is mirrored, and a conductive layer may be disposed on itself. Conductive layers may also be electrically connected at the folds or within the roll. These are allowed embodiments of the invention.

Isotope-enriched materials may be used for enhanced sensitivity to neutrons. For example, the most abundant isotope of boron is $^{11}B$, but $^{10}B$ (20% abundance) has a neutron capture cross-section that is nearly $10^6$ times larger than $^{11}B$ for energies below 100 eV (and at least 100 times larger for all energies). Thus, by comparing the resistance change of a device (e.g., the example embodiment) fabricated from $^{10}B$-enriched hBN to a similar device fabricated from $^{11}B$-enriched hBN, the resistance change due to neutron irradiation can be isolated from the resistance change due to other ionizing radiations. Insulators that incorporate Gadolinium (Gd) isotopes (e.g., gadolinium oxide) will also be useful for this purpose, since $^{157}Gd$ has a neutron capture cross-section even larger (60-70 times) than $^{10}B$. Another example is a device incorporating a hafnium compound in its neutron-sensitive layer versus an otherwise identical device incorporating the analogous zirconium compound, since zirconium forms most of the same compounds as hafnium but has a much smaller neutron cross section.

One embodiment can be derived from the differential measurement comparing signals from two devices that are substantially the same except for radiation particle sensitivities (e.g., neutron cross sections) of the constituent materials.

Embodiments incorporating quasi-2D materials may be patterned in a quasi-1D geometry in order to increase the electrical resistance of the device. The quasi-1D area can be straight, or, to increase the total area for interaction with radiation, the quasi-1D area may meander. Embodiments incorporating microscopic flakes may incorporate isotopically-enriched materials (as above) for enhanced sensitivity to neutrons. Embodiments incorporating microscopic flakes may be patterned or printed into a quasi-1D geometry (e.g., a meander line) in order to increase electrical resistance.

In certain embodiments, the conductive layer(s) may be formed from borophene, i.e., a 2D boron material with boron-boron chemical bonds and the insulating layer(s) may incorporate borophene or other boron allotropes (including 3D allotropes or nanocrystals). In other embodiments, the conductive layer(s) may be formed from or contain hafnium (Hf) and the insulating layer(s) may consist of an insulator containing hafnium (Hf), e.g., hafnium dioxide or hafnium silicate. The conductive layer(s) may also be formed from or contain gadolinium (Gd) and the insulating layer(s) may consist of an insulator containing gadolinium (Gd), e.g., an oxide of gadolinium or gadolinium silicate. Some or all of these materials may be isotopically enriched. Generally, useful elemental constituents of the neutron-sensing layers (insulating or conducting) would be isotopes of boron, cadmium, hafnium, gadolinium, cobalt, samarium, titanium, dysprosium, erbium, europium, molybdenum, and ytterbium. These may be as isotopic mixtures, as elemental mixtures, and as compounds with other elements (e.g. boride nitrides and boride carbides, metal-borides such as $MgB_2$ or $ZrB_2$, gadolinium oxides, hafnium oxides, etc.).

The detector can be employed in a number of different applications. For example, it may be used in passive dosimetry, active real time radiation detection. In one embodiment, it may be employed as radiation detector in naval water intake pipe to determine how much radiation has been drawn in the ship in a high radiation environment.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. It is intended that the claims and claim elements recited below do not invoke 35 U.S.C. § 112(f) unless the words "means for" or "step for" are explicitly used in the particular claim. The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A radiation detector, comprising:
   (a) a first insulating substrate including boron nitride that includes more $^{10}$B than $^{11}$B, which undergoes a change in an electrical property when subjected to ionizing radiation;
   (b) a first conductive film disposed in relation to a surface of the first insulating substrate, the first conductive film having a resistance that is at least partially a function of a state of the electrical property of the first insulating substrate;
   (c) a first resistance measuring device for measuring resistance across the first conductive film, wherein the resistance measured by the first resistance measuring device indicates an amount of ionizing radiation to which the first insulating substrate has been subjected;
   (d) a second insulating substrate including boron nitride that includes more $^{11}$B than $^{10}$B;
   (e) a second conductive film disposed on a surface of the second insulating substrate, the second conductive film having a resistance that is at least partially a function of a state of a predetermined property of the second insulating substrate;
   (f) a second resistance sensor for measuring resistance across at least a portion of the second conductive film; and
   (g) a comparison circuit that compares resistance measured by the first resistance sensor to resistance measured by the second resistance sensor, thereby indicating an amount of radiation exposure that is attributable to neutrons.

2. The radiation detector of claim 1, wherein the first resistance measuring device comprises:
   (a) a first electrical contact in electrical communication with the first conductive film and a spaced-apart second electrical contact in electrical communication with the first conductive film;
   (b) a current source configured to apply a current from the first electrical contact to the second electrical contact;
   (c) a third electrical contact in electrical communication with the first conductive film and a spaced-apart fourth electrical contact in electrical communication with the first conductive film, the third electrical contact and the fourth electrical contact disposed between the first electrical contact and the second electrical contact; and
   (d) a first resistance sensor configured to measure a resistance between the third electrical contact and the fourth electrical contact.

3. The radiation detector of claim 1, wherein the first conductive film comprises graphene.

4. The radiation detector of claim 3, wherein the graphene comprises a graphene sheet.

5. The radiation detector of claim 3, wherein the graphene comprises a contiguous plurality of graphene flakes that are in electrical communication with each other.

6. The radiation detector of claim 1, wherein the first conductive film comprises a material selected from a list consisting of: graphene, a conductive boron allotrope, hafnium, bismuth, gadolinium and combinations thereof.

7. The radiation detector of claim 1, where the first insulating substrate comprises a material selected from a list consisting of: boron nitride, a boron allotrope, an insulating hafnium compound, hafnium dioxide, hafnium silicate, an insulating gadolinium compound, a gadolinium oxide, gadolinium silicate and combinations thereof.

8. The radiation detector of claim 1, wherein the first insulating substrate comprises a gamma radiation-sensitive material.

9. The radiation detector of claim 8, wherein the gamma sensitive material comprises a high-Z material.

10. The radiation detector of claim 1, wherein the first insulating substrate and the first conductive film have an undulated shape.

11. The radiation detector of claim 1, wherein the first insulating substrate and the first conductive film have a square shape.

12. The radiation detector of claim 1, further comprising an amplifying layer including a material that has an electrical property that changes when the change in the electrical property of the first insulating substrate occurs, thereby increasing a change in the resistance across the first conductive film when the first insulating substrate has been subjected to radiation.

13. The radiation detector of claim 12, wherein the amplifying layer is disposed between the first insulating substrate and the first conductive film.

14. The radiation detector of claim 12, wherein the amplifying layer comprises a non-conductive ferroelectric material.

15. The radiation detector of claim 1, further comprising an encapsulating material enveloping at least the first insulating substrate and the first conductive film.

16. The radiation detector of claim 15, wherein the encapsulating material comprises a flexible polymer.

17. A radiation detection system, comprising:
   (a) a first boron nitride substrate that includes more $^{10}$B than $^{11}$B;
   (b) a conductive film disposed in relation to a surface of the first boron nitride substrate, the conductive film having a resistance that is at least partially a function of a state of a predetermined property of the first boron nitride substrate;
(c) a first electrical contact in electrical communication with the conductive film and a spaced-apart second electrical contact in electrical communication with the conductive film;
(d) a current source configured to apply a current from the first electrical contact to the second electrical contact;
(e) a third electrical contact in electrical communication with the conductive film and a spaced-apart fourth electrical contact in electrical communication with the conductive film, the third electrical contact and the fourth electrical contact disposed between the first electrical contact and the second electrical contact;
(f) a first resistance sensor configured to measure a resistance between the third electrical contact and the fourth electrical contact,
wherein the resistance measured by the resistance sensor indicates an amount of ionizing radiation to which the boron nitride substrate has been subjected;
(g) a second boron nitride substrate that includes more $^{11}$B than $^{10}$B;
(h) a second conductive film disposed on a surface of the second boron nitride substrate, the second conductive film having a resistance that is at least partially a function of a state of a predetermined property of the second boron nitride substrate;
(i) a second resistance sensor for measuring resistance across at least a portion of the second conductive film; and
(j) a comparison circuit that compares resistance measured by the first resistance sensor to resistance measured by the second resistance sensor, thereby indicating an amount of radiation exposure that is attributable to neutrons.

18. The radiation detection system of claim 17, wherein the conductive film comprises graphene.

19. The radiation detection system of claim 17, further comprising a non-conductive ferroelectric layer, the ferroelectric layer including a material that has an electrical property that changes when the change in the electrical property of the first boron nitride substrate occurs, thereby increasing a change in the resistance across the first conductive film when the first boron nitride substrate has been subjected to radiation.

20. The radiation detection system of claim 19, wherein the ferroelectric layer is disposed between the first boron nitride substrate and the first conductive film.

21. The radiation detection system of claim 17, further comprising an encapsulating material enveloping at least the first boron nitride substrate and the first conductive film.

22. The radiation detection system of claim 21, wherein the encapsulating material comprises a flexible polymer.

23. A method of determining exposure to a type of radiation, comprising the steps of:
(a) exposing a first boron nitride substrate that includes more $^{10}$B than $^{11}$B and a second insulating substrate including boron nitride that includes more $^{11}$B than $^{10}$B to a radiation environment;
(b) measuring a first resistance across a first conductive film disposed in relation to a surface of the first boron nitride substrate such that resistance across the conductive film changes as a result of exposure of the boron nitride substrate to the type of radiation and measuring a second resistance across a second conductive film disposed on a surface of the second insulating substrate, the second conductive film having a resistance that is at least partially a function of a state of a predetermined property of the second insulating substrate;
(c) calculating an amount of radiation exposure as a function of the first resistance and
(d) compaing resistance measured by the first resistance sensor to resistance measured by the second resistance sensor, thereby indicating an amount of radiation exposure that is attributable to neutrons.

* * * * *